(12) United States Patent
Zhou et al.

(10) Patent No.: US 8,107,537 B2
(45) Date of Patent: Jan. 31, 2012

(54) PICTURE LAYER RATE CONTROL FOR VIDEO ENCODING

(75) Inventors: Zhi Zhou, Issaquah, WA (US); Shijun Sun, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1765 days.

(21) Appl. No.: 11/347,718

(22) Filed: Feb. 2, 2006

(65) Prior Publication Data
US 2007/0177665 A1 Aug. 2, 2007

(51) Int. Cl.
*G06K 9/36* (2006.01)
*G06K 9/46* (2006.01)
*G06K 9/00* (2006.01)

(52) U.S. Cl. ......... 375/240.25; 375/240.26; 375/240.27; 382/232; 382/239; 382/251; 382/252

(58) Field of Classification Search ............. 375/240.25, 375/240.22, 240.26; 704/500–501, 503–504; 382/232, 233, 238, 239, 244–250, 254, 251–253
See application file for complete search history.

(56) References Cited

U.S. PATENT DOCUMENTS

| | | | |
|---|---|---|---|
| 5,617,150 A | 4/1997 | Nam et al. | |
| 5,847,761 A | 12/1998 | Uz | |
| 6,141,380 A | 10/2000 | Krishnamurthy | |
| 6,215,820 B1 | 4/2001 | Bagni et al. | |
| 7,346,216 B2 * | 3/2008 | Adachi et al. | 382/236 |
| 2002/0071608 A1 * | 6/2002 | Fert et al. | 382/239 |
| 2004/0146103 A1 | 7/2004 | Chang et al. | |
| 2004/0179596 A1 * | 9/2004 | Song et al. | 375/240.03 |
| 2004/0202247 A1 * | 10/2004 | Chang et al. | 375/240.03 |
| 2005/0175093 A1 * | 8/2005 | Haskell et al. | 375/240.03 |
| 2005/0201460 A1 * | 9/2005 | Kang et al. | 375/240.03 |
| 2005/0232597 A1 * | 10/2005 | Shimazaki et al. | 386/95 |

OTHER PUBLICATIONS

Siwei Ma, Zhengguo Li, Feng Wu, "Proposed Draft of Adaptive Rate Control", Joint Video Team (JVT) of ISO/IEC MPEG & ITU-T VCEG, 8th Meeting: Geneva, May 20-26, 2003, Document JVT-H017 Filename: JVT-H017.doc, Institute of Computing Technology, Chinese Academy of Sciences, pp. 1-9.
Rate Control and Quantization Control, Aug. 19, 2004 From: http://www.mpeg.org/MPEG/MSSG/tm5/Ch10/Ch10.html.
H.264/MPEG-4 AVC, Wikipedia, 12 pages, Nov. 8, 2006, http://en.wikipedia.org/wiki/H.264.
H.264 Advanced Video Coding: A whirlwind tour, PixelTools, 8 pages, Nov. 8, 2006, http://www.pixeltools.com/h264_paper.html.
Rate Control and H.264, PixelTools, 6 pages, Nov. 23, 2005, http://www.pixeltools.com/rate_control_paper.html.

(Continued)

*Primary Examiner* — David C. Payne
*Assistant Examiner* — Linda Wong
(74) *Attorney, Agent, or Firm* — Marger Johnson & McCollom, P.C.

(57) ABSTRACT

A one-pass picture-layer rate control (RC) method and system for controlling a video encoder: The bit allocation and determination of quantization parameter (QP) in this rate control method and system are based on a Rate-Quantization (R-Q) scale model. The R-Q model is a linear one, wherein the number of bits per picture is in reverse ratio of quantization scale for that picture. A conversion of exponential-based QP to linear-scaled QP is taken in the calculation of complexity model and determination of QP. The conversion is integer-based and is consistent with the quantization array defined in the H.264 standard.

24 Claims, 4 Drawing Sheets

OTHER PUBLICATIONS

Joao Valentim, Paulo Nunez, Fernando Pereira, An Alternative Complexity Model for the MPEG-4 Video Verifier Mechanism, Instituto Superior Tecnico (IST)—Instituto de Telecomunicacoes, 6 pages, Lisboa, Portugal.

N. Mohsenian, R. Rajagopalan, C.A. Gonzalez, Single-pass constant- and variable-bit-rate MPEG-2 video compression, International Business Machines Corp., Jul. 1999, pp. 489-509 vol. 43 No. 4.

* cited by examiner

PICTURE LAYER RATE CONTROL FOR VIDEO ENCODING

FIELD OF THE INVENTION

The present invention relates to digital video compression systems and more particularly to rate control for an encoder in a digital video compression system.

BACKGROUND OF THE INVENTION

Video encoding processes, such as those defined by the MPEG standards and by the H.264 standard, are lossy processes. That is, such processes compress an image stream by removing redundant information. Compression techniques make quality compromises, but the quality compromises are made in ways that are minimally perceptible.

It is conventional to control the amount of detail that an encoder retains by what is conventionally referred to as a Quantization Parameter (QP). When QP is small there is a relatively small amount of compression, that is, a large amount of the detail is retained. When QP is large, there is a high rate of compress, thus, more detail is lost. With respect to bit rate, a small QP results in a high bit rate and a large QP results in a lower bit rate. Controlling the value of QP in a video system is generally termed rate control.

The rate control mechanism in a video compression system is generally designed so that the system's output can meet particular bandwidth and quality requirements. In general, in order to control bit rate, a particular QP value is determined for each picture or macro block based upon the statistical properties of the video signal and the number of bits in the output buffer.

A number of different types of rate control mechanisms are described in the publicly available technical literature. For example, a publicly available document entitled: "Proposed Draft of Adaptive Rate Control" describes a rate control mechanism that is based on what is known as a Group of Pictures (GOP). The document entitled "Proposed Draft of Adaptive Rate Control" was presented at the Joint Video Team (JVT) of ISO/IEC MPEG & ITU-T VCEG (ISO/IEC JTC1/SC29/WG11 and ITU-T SG16 Q.6) 8th Meeting: Geneva, May 20-26, 2003 (document JVT-H017). The rate control mechanism described in the above referenced paper can not achieve smooth quality on GOP boundaries. Furthermore, the rate model described in the above referenced document is quadratic and thus requires a relatively complicated calculation.

The present invention provides an improved method and system for rate control.

SUMMARY OF THE INVENTION

The present invention provides a, one-pass, picture-layer rate control (RC) method and system for controlling a video encoder. Bit allocation and determination of quantization parameter (QP) in the rate control method and system of the present invention are based on a Rate-Quantization (R-Q) scale model. The R-Q model is a linear one, wherein the number of bits per picture is in reverse ratio to quantization scale for that picture. A conversion of exponential-based QP to linear-scaled QP is taken in the calculation of complexity model and determination of QP. The conversion is integer-based and is consistent with the quantization array defined in the H.264 standard.

DETAILED DESCRIPTION

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate the preferred embodiments of the invention and the operation of such embodiments. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the embodiment to those skilled in the art. Those parts and elements not shown are conventional and known in the art.

The preferred embodiment described herein utilizes the compression technique described in the H.264 standard. The H.264 standard is defined in documents published by the International Telecommunication Union (herein referred to as the ITU) and by the International Standard Organization (herein referred to as the ISO). The H.264 compression standard is described and defined, among other places, in the following three documents: (1) ITU-T Rec. H.264, (2) ISO/IEC 14496-10, and (3) ISO/IEC 14496-10/FDAM1. Copies of the above three documents are publicly available and they can be obtained from the ITU and ISO. The above three documents are hereby incorporated herein in their entirety.

Figure 1:
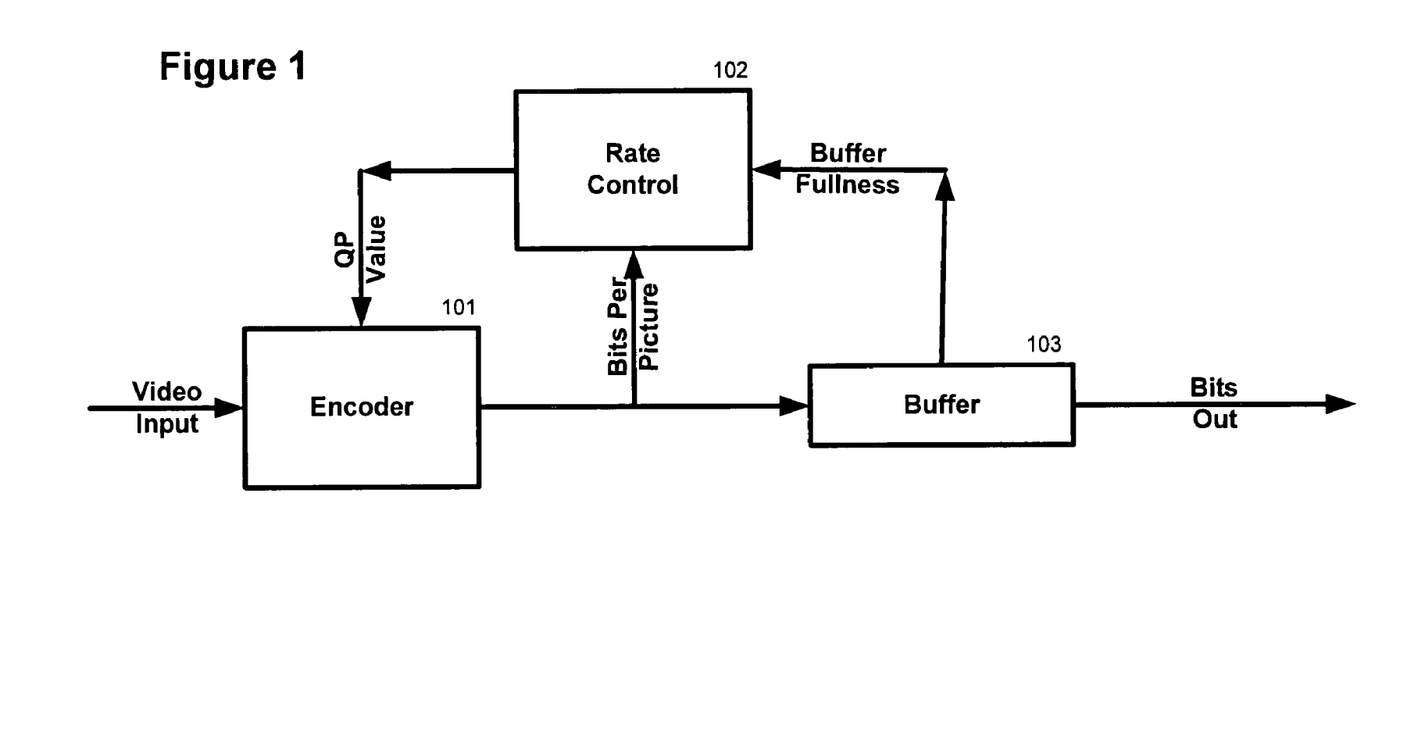
FIG. 1 is a block diagram of a first embodiment of the invention.

FIG. 1 shows a block diagram of a first preferred embodiment of the present invention. Video input is provided to a conventional encoder 101. As is conventional, the amount of compression of the video signal is controlled by a QP input to encoder 101. Encoder 101 produces intraframe (I), forward prediction (P), and bidirectional prediction (B) pictures as is conventional. The terms I, P and B pictures are used herein as these termed are used in the technical literature related to MPEG compression.

The output of encoder 101 is provided to a conventional buffer 103 and to a rate control unit 102. Rate control unit 102 receives a signal from buffer 103 which indicates the degree to which buffer 103 is full. Buffer 103 provides the system output.

Figure 2:
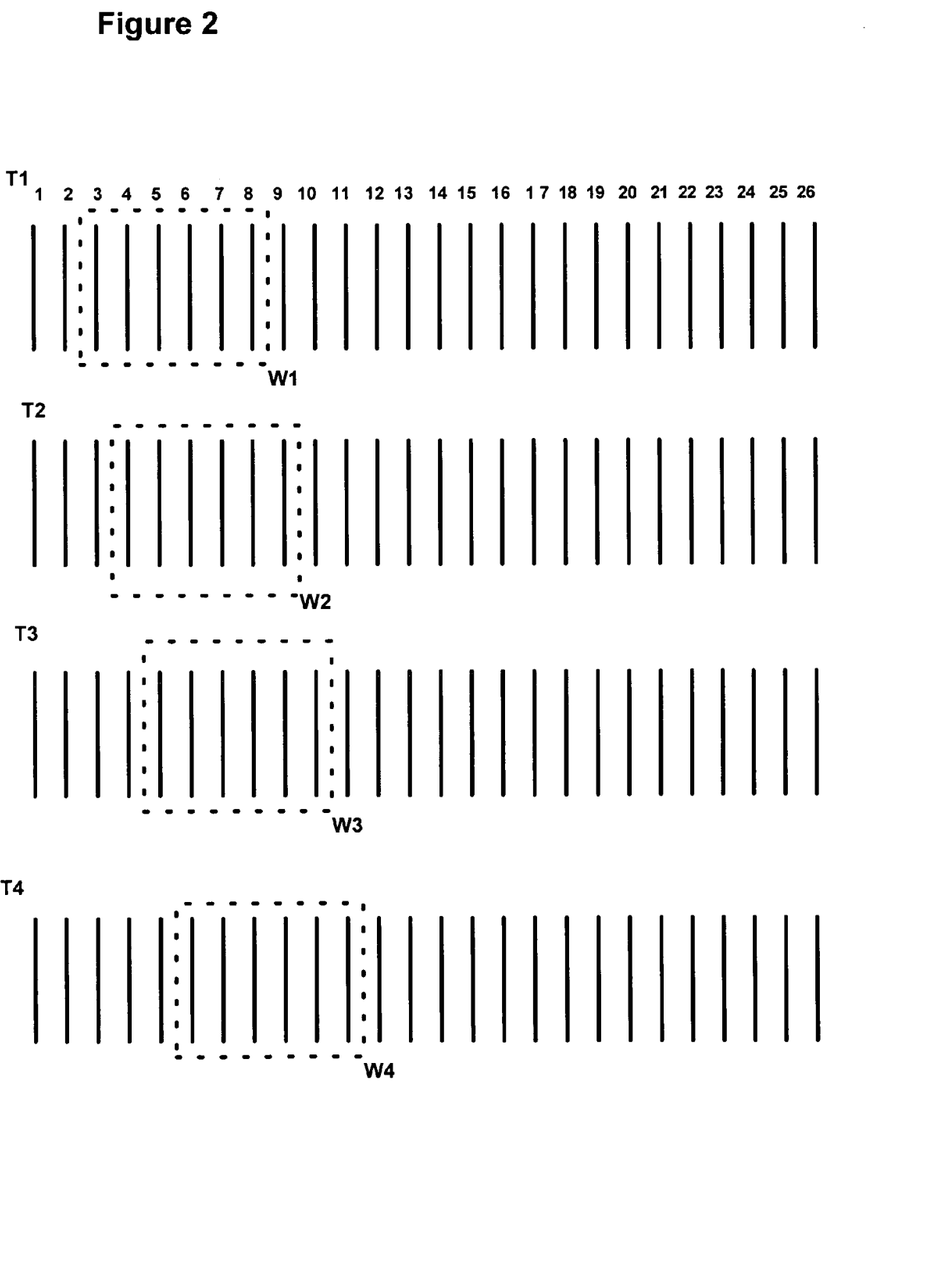
FIG. 2 is a diagram illustrating the moving window used with the present invention.

Rate control 102 examines a sliding window of the images produced by encoder 101 as illustrated in FIG. 2. The bits for each picture are allocated within a forward sliding window, which can distribute the available bits to more pictures even across GOP boundaries.

FIG. 2 shows 26 pictures numbered 1 to 26 at four different times T1 to T4. Pictures 1 to 26 are conventional I, B and P pictures. The position of the window W is shown at each of the four times. The interval between the times T1, T2, etc. is equal to the encoding time between each of the pictures 1 to 26. In the preferred embodiment each window covers 15 pictures; however, for convenience of illustration, in FIG. 2 each window is shown as only covering six pictures. Information concerning the pictures in a sliding window is used for each calculation of QP. As the window moves to a new position, a new value of QP is calculated. The mechanism used at the beginning and end of the video stream is described below.

The sliding window approach enables smoother video quality, especially across GOP boundaries, compared with GOP-based RC methods.

The rate control unit 102 performs the following three major steps:
(1) bit allocation
(2) determination of QP, and
(3) complexity model update.

Steps (1) and (2) are done before encoding each current picture and step (3) is done after encoding each picture. The calculations performed in each of the above three steps will now be explained.

Bit allocation: During bit allocation, the target for the number of bits for the current picture is calculated by the complexity ratio of the current picture and the sum of the complexity of all pictures remaining in the current sliding window. Stated mathematically, the target for the number of bits is calculated as indicated in equation 1 below.

$$\text{Target\_bits} = \frac{\frac{X_{cur}}{K_{cur}}}{\left(\frac{N_i X_i}{K_i} + \frac{N_p X_p}{K_p} + \frac{N_b X_b}{K_b}\right)} * B_r \quad (1)$$

Where:

$N_i$, $N_p$ and $N_b$ are the remaining numbers of I, P, B picture in the current sliding window, respectively.

$B_r$ is the number of bits allocated to all pictures within the sliding window.

$X_i$, $X_p$ and $X_b$ are the complexity measurements of I, P, B pictures.

$K_i$, $K_p$ and $K_b$ are constants to control the relative importance for I, P and B pictures.

$X_{cur}$ is the complexity for the current picture, which is predicted from previous pictures with the same type. $K_{cur}$ is the constant for the current picture. In this embodiment, $K_i=1.0$, $K_p=1.0$, $K_b=1.4$, which means the QP for B is set roughly 3 larger than that of I and P. That is, S[3]/S[0]=14/10=1.4. See Equation (4) below.

It is noted that the sliding window includes a number of future pictures as well as the current picture.

The following R-Q model is used to calculate the complexity X:

$$X = R * Q_{scale} \quad (2)$$

where R is the bits for each picture and $Q_{scale}$ is the quantization scale for each picture.

Quantization scale is a number that describes the quality level of an image. A higher number indicates stronger compression, that is, worse quality. A lower number indicates lighter compression, that is, better quality. Some of encoders use the standard linear quantization tables, while others use internal or custom, non-linear tables. The H.264 standard referenced above includes a non-linear quantization table that is hereby incorporated herein by reference.

The complexity, X, is updated after encoding each picture and is calculated for I, P and B pictures independently.

Since the relationship between QP and quantization scale of H.264 is exponential, the convert from Quantization Parameter to Quantization Scale is necessary in calculating the complexity model:

$$Q_{scale} = Q\text{Scale}(QP) = S[QP\%6] << (QP/6) \quad (3)$$

where $$S = [10, 11, 13, 14, 16, 18] \quad (4)$$

It is noted that S is part of the dequantization table defined in the H.264 standard. Details are given in the H.264 standard Section 8.5.5. In the preferred embodiment, the dequantization parameters correspond to the DC components. In alternate embodiments different part of the table can be used for the QP conversion.

Figure 3:
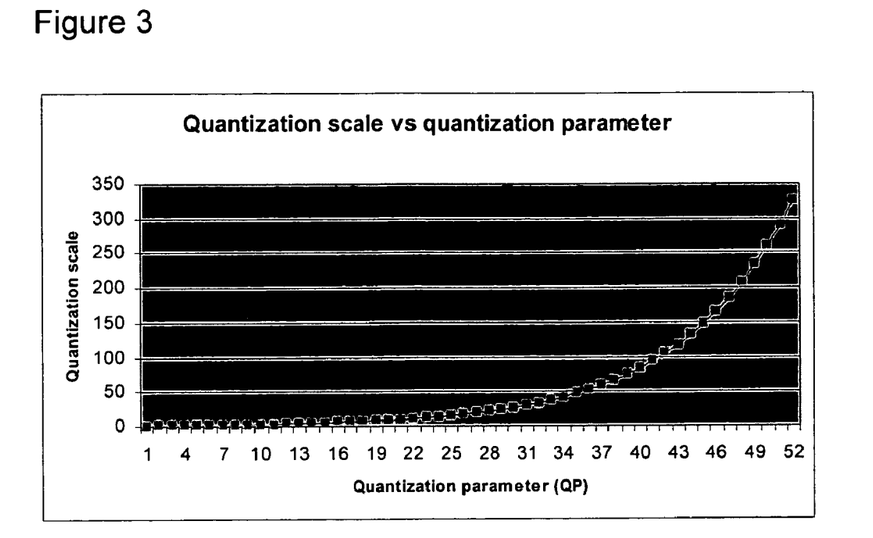
FIG. 3 shows the Quantization scale versus quantization parameter.

The QP conversion table for the preferred embodiment is illustrated as FIG. 3.

The target number of bits per picture is further clipped by:

$$\text{Target\_bits} = \max\left(\text{Target\_bits}, \frac{\text{Bit\_rate}}{16 * \text{Picture\_rate}}\right) \quad (5)$$

In the above formula, "Picture_rate" is the rate at which pictures are encoded and "Bit_rate" is the desired rate of bits at the system output. The number 16 in the above formula is termed the "threshold value". At the point where the threshold value times the "Picture_rate" equals the "Bit_rate", no clipping occurs. Since the preferred embodiment utilizes the prediction method defined in the H.264 standard, the number of bits per picture is relatively small, and hence, the threshold value is set to a relatively high value. Other embodiments may use different threshold values as dictated by the engineering considerations of each particular embodiment.

$B_r$ is initialized as:

$$B_r = N_{win} * \frac{\text{Bit\_rate}}{\text{Picture\_rate}} \quad (6)$$

where $N_{win}$ is the number of pictures in the sliding window and the Bit_rate and Picture_rate are conventional values established for a particular implementation.

Determination of QP for Each Frame

The Quantization Scale is determined by the R-Q model as follows:

$$Q_{scale} = \frac{X}{\text{Target\_Bits}} \quad (7)$$

Target_Bits is the allocated target bits for the current picture as per equations by (1) and (5). X is the complexity measurement predicted from previous pictures with the same type (i.e. I, B or P types of pictures).

Quantization Scale is converted back to H.264 QP to be used in the quantization process of the current picture:

$$QP = \min_{QP} |Q_{scale} - Q\text{Scale}(QP)| \quad (8)$$

Where the conversion function QScale(QP) is defined in Eq. (3). This can be determined by a binary search.

The QP is further clipped by following rules:

To prevent quality fluctuation, QP's of I and P are clipped to [QP_IP−ΔQP, QP_IP+ΔQP], where QP_IP is the QP of the previous I or P. ΔQP=3 can achieves the best result in the preferred embodiment. If ΔQP is too large, the clip has no effect. If ΔQP is too small, the RC may not be able to hit target bit rate and the control is not flexible.

In addition, to allocate more bits for reference picture, QP of B is clipped to [QP_IP, QP_IP+ΔQP], where QP_IP is the max of two referenced I or P picture and ΔQP=3.

QP is allowed to change as large as 6 (ΔQP=6) for the first sliding window, to eliminate the effect of initial QP to RC and stabilize the PSNR as soon as possible. For the last window, QP is also allowed to change by up to 6, to achieve the target bit-rate accurately.

Complexity Model and Remaining Bits Update:

After encoding the current picture:

The complexity for I, P or B pictures are independently updated, by a weighted average with the previous one:

$$X_{curr} = (X_{curr} + B_{curr} \times Q\text{Scale}(QP)) \gg 1 \qquad (9)$$

The remaining number of I, P, B pictures in the current sliding window $N_i$, $N_p$ and $N_b$ are updated.

The remaining bits for the sliding window $B_r$ is updated by:

$$B_r = B_r - B_{cur} \qquad (10)$$

where $B_{cur}$ is the actual bits for the current frame.

$B_r$ is also updated by $$B_r = B_r + \frac{\text{Bit\_rate}}{\text{Picture\_rate}} \qquad (11)$$

After the sliding window reaches the last picture of the sequence, the updated step in Eq. (11) is skipped. Then, for each of the remaining pictures in the last segment of a sequence, $B_r$ is only updated by Eq. (10) and the numbers of I, P, B pictures remaining are updated correspondingly.

In the preferred embodiment, the QP for the first picture is set by a conventional configuration file. The initial complexity of I is then obtained after encoding the first picture. The initial complexity of P and B are set as ⅓ and ⅙ of I picture's complexity. The final results are not sensitive to the initial complexity values.

Decoder buffer consideration: The complexity model and RC can't guarantee hypothetical reference decoder (HRD) compliance. To prevent buffer from overflow and underflow, the RC sets a protection when determining QP. When the buffer fullness is larger than 80% of the buffer size, QP+=3. When it is less than 20%, QP−=3.

Adaptive ΔQP for P picture: To improve the average video quality, the ΔQP for clipping QP is set adaptively. For the first P picture after I, it is set as 1; for the second, it is set to 2, and for others it is set to 3. This is to improve the quality of those more important P pictures and therefore improve the average peak signal-to-reconstructed image (PSNR) measure for the whole sequence. This clipping is not applied to the first two GOPs or to the last one.

It should be understood that the above specific values can be different in alternate embodiments.

Figure 4:
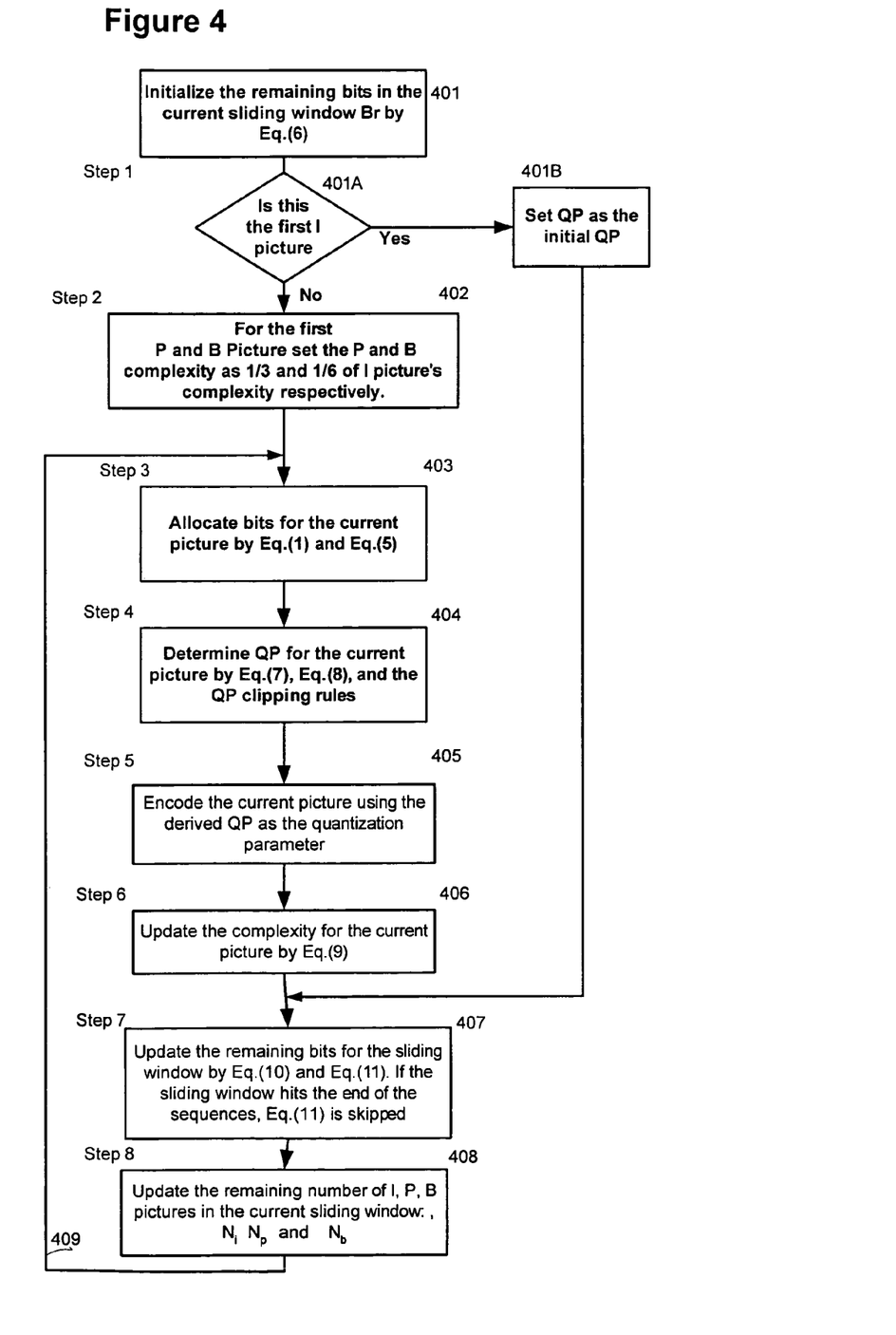
FIG. 4 is a flow diagram showing the operation performed by a preferred embodiment.

The operation of the system is illustrated and explained by the block flow diagram in FIG. 4.

Blocks 401, 401A, 401B and 402 are initialization steps. The initialization is different with respect to I pictures and with respect to P and B Pictures. In the initial step, as indicated by block 401, the bits in the current sliding window are initialized. That is, Br is set as indicated by Eq. (6) given above. Different steps are performed for the first I picture and for the first P or B picture as indicated by block 401B. As indicated by block 401B, for the first I picture, QP is set to an initial vale (as specified in a conventional configuration files) and the process proceeds directly to Step 7, that is, block 407.

As indicated by block 402, for the first P and B pictures the complexity is set to ⅓ and ⅙ of I picture's complexity, respectively.

Next as indicated by block 403, the bits for the current picture are allocated as specified by Eq. (1) and Eq. (5) given above.

In the fourth step, as indicated by block 404, QP is determined for the current picture as specified by Eq. (7), Eq. (8), and by the QP clipping rules given above.

In the fifth step, as indicated by block 405, the current picture is encoded using the derived QP as the quantization parameter.

In the sixth step, as indicated by block 406, the complexity for the current picture is updated as specified by Eq. (9) above.

In the seventh step, as indicated by block 407, the remaining bits for the sliding window are updated as specified by Eq. (10) and Eq. (11) above. However, if the sliding window hits the end of the sequences, Eq. (11) is skipped.

In the eight step, as indicated by block 408 the remaining number of I, P, and B pictures in the current sliding window are updated.

As indicated by the line 409, steps 3 to step 8 are repeated for all the remaining frames.

In summary, the preferred embodiment described above uses a one-pass picture-layer rate control (RC) method for H.264 encoding, with low calculation complexity. The bit allocation and determination of quantization parameter (QP) are based on a Rate-Quantization (R-Q) scale model. The R-Q model is a linear one, wherein the number of bits per picture is in reverse ratio of quantization scale for that picture. A conversion of exponential-based QP to linear-scaled QP is taken in the calculation of complexity model and determination of QP. The conversion is integer-based and is consistent with the quantization array defined in the H.264 standard.

While the invention has been shown and described with respect to preferred embodiments thereof, it should be understood that various changes in form and detail can be made without departing from the spirit and scope of the invention. The scope of the invention is limited only by the appended claims.

We claim:

1. A method for one pass, picture layer, rate control for a video encoder that encodes a video stream that includes a series of pictures, said method including the steps of:

determining the complexity of the pictures in a forward sliding window that covers a plurality of pictures including a current picture, calculating a target number of bits for each current picture using the complexity ratio of said current picture and the sum of the complexity of all pictures remaining in the current sliding window, the complexity of each particular picture being calculated using a linear rate quantization scale model, calculating a quantization parameter (QP) for each current picture using said calculated target number of bits and a quantization scale determined by said rate quantization scale model, controlling said encoder using said quantization parameter (QP), wherein said sliding window is moved by one picture each time that QP for a particular picture is calculated, wherein the plurality of pictures including the current picture corresponds to fifteen pictures, and the sliding window covers the fifteen pictures, the method further comprising:

determining the complexity of each of the fifteen pictures in the forward sliding window, calculating a target number of bits for each current picture using the complexity ratio of said current picture and the sum of the complexity of all fourteen pictures remaining in the current sliding window, the complexity of each particular picture being calculated using a linear rate quantization scale model, calculating a quantization parameter (QP) for each current picture using said calculated target number of bits and a quantization scale determined by said rate quantization scale model, controlling said encoder using said quantization parameter (QP); and moving said sliding window by one picture each time said QP for a particular picture is calculated.

2. The method of rate control defined in claim 1 wherein said encoder, encodes pictures according to the H.264 compression standard.

3. The method of rate control recited in claim 1 wherein said series of pictures includes intraframe (I) pictures, forward prediction (P) pictures, and bidirectional prediction (B) pictures.

4. The method of rate control recited in claim 1 wherein after encoding said current picture the complexity of each picture is updated independently by a weighted average with the previous picture.

5. The method of rate control defined in claim 1 wherein an exponential based QP is converted to a linear scale QP in the calculation of said linear rate quantization scale model.

6. The method of rate control recited in claim 1 wherein said sliding window covers a plurality of pictures even across Group of Picture (GOP) boundaries.

7. The rate control method recited in claim 1 wherein said sliding window takes in one new picture and drops one previous picture after said value of QP for the current picture is calculated and the new content of said window is used to calculate QP for the next picture.

8. The rate control method recited in claim 1 wherein, in said linear rate quantization scale model, the number of bits for each particular picture is in reverse rate of the quantization scale for said particular picture.

9. The rate control method recited in claim 1 wherein said method includes the steps of bit allocation, determination of QP value and complexity model update.

10. The rate control method recited in claim 1 wherein the target number of bits for each picture is clipped by a ratio of the desired bit rate divided by a threshold value times the rate that pictures are encoded.

11. The method of rate control defined in claim 1 wherein moving said sliding window includes moving said sliding window across GOP boundaries so that the sliding window simultaneously covers pictures from multiple GOPs.

12. The method of rate control defined in claim 1, further comprising:

initializing, by a rate control unit, the value of the bits ($B_r$) in the current sliding window by:

$$B_r = N_{win} * \frac{\text{Bit\_rate}}{\text{Picture\_rate}}$$

where $N_{win}$ is the number of pictures in the sliding window,
Bit_rate is an integer value,
and Picture_rate is the rate at which pictures are encoded, calculating, by the rate control unit, the target for the number of bits (Target_bits) as $$\text{Target\_bits} = \frac{\frac{X_{cur}}{K_{cur}}}{\left(\frac{N_i X_i}{K_i} + \frac{N_p X_p}{K_p} + \frac{N_b X_b}{K_b}\right)} * B_r$$

where, $N_i$, $N_p$ and $N_b$ are the remaining numbers of I, P, B picture in the current sliding window respectively, $X_i$, $X_p$ and $X_b$ are the complexity measurements of I, P, B pictures, $K_i$, $K_p$ and $K_b$ are constants to control the relative importance for I, P and B pictures, $X_{curr}$ is a measurement of complexity for a current picture, and $K_{curr}$ is a constant value for the current picture, clipping the target number of bits per picture by:

$$\text{Target\_bits} = \max\left(\text{Target\_bits}, \frac{\text{Bit\_rate}}{16 * \text{Picture\_rate}}\right); \text{ and}$$

controlling said video encoder based on said clipped target number of bits per picture.

13. A rate control for a video encoder that encodes a video stream of I, P, and B pictures, said stream having a particular Bit_rate and Picture_rate, said method utilizing a forward sliding window that covers a plurality of pictures, said method including the steps of:

initializing, by a rate control unit, the value of the bits ($B_r$) in the current sliding window by:

$$B_r = N_{win} * \frac{\text{Bit\_rate}}{\text{Picture\_rate}}$$

where $N_{win}$ is the number of pictures in the sliding window,
Bit_rate is an integer value,
and Picture_rate is the rate at which pictures are encoded, calculating, by the rate control unit, the target for the number of bits (Target_bits) as $$\text{Target\_bits} = \frac{\frac{X_{cur}}{K_{cur}}}{\left(\frac{N_i X_i}{K_i} + \frac{N_p X_p}{K_p} + \frac{N_b X_b}{K_b}\right)} * B_r$$

where, $N_i$, $N_p$ and $N_b$ are the remaining numbers of I, P, B picture in the current sliding window respectively, $X_i$, $X_p$ and $X_b$ are the complexity measurements of I, P, B pictures, $K_i$, $K_p$ and $K_b$ are constants to control the relative importance for I, P and B pictures, $X_{curr}$ is a measurement of complexity for a current picture, and $K_{curr}$ is a constant value for the current picture, clipping the target number of bits per picture by:

$$\text{Target\_bits} = \max\left(\text{Target\_bits}, \frac{\text{Bit\_rate}}{16 * \text{Picture\_rate}}\right); \text{ and}$$

controlling said video encoder based on said clipped target number of bits per picture.

14. The method of claim 13 including the step of:

determining, by the rate control unit, a value of a quantization parameter (QP) for the current picture by first calculating the Quantization Scale ($Q_{scale}$) by:

$$Q_{scale} = \frac{X}{\text{Target\_Bits}}$$

$$QP = \min_{QP} |Q_{scale} - QScale(QP)|$$

where X is a measurement of complexity, and
where QScale(QP) is a function of QP defined as:

$Q\text{Scale}(QP) = S[QP\%6] << (QP/6)$ $S = [10, 11, 13, 14, 16, 18]$; and controlling said video encoder using said quantization parameter (QP).

15. A system for one pass, picture layer, rate control for a video encoder that encodes a video stream that includes a series of pictures, said system including:
   means for determining the complexity of the pictures in a forward sliding window that covers a plurality of pictures including a current picture,
   means for calculating a target number of bits for each current picture using the complexity ratio of said current picture and the sum of the complexity of all pictures remaining in the current sliding window, the complexity of each particular picture being calculated using a linear rate quantization scale model,
   means for calculating a quantization parameter (QP) for each current picture using said calculated target number of bits and a quantization scale determined by said rate quantization scale model,
   means for controlling said encoder using said quantization parameter (QP), and wherein said sliding window covers a plurality of pictures even across Group of Picture (GOP) boundaries,
   wherein the plurality of pictures including the current picture corresponds to fifteen pictures, and the sliding window covers the fifteen pictures, the system further comprising:
   means for determining the complexity of each of the fifteen pictures in the forward sliding window,
   means for calculating a target number of bits for each current picture using the complexity ratio of said current picture and the sum of the complexity of all fourteen pictures remaining in the current sliding window, the complexity of each particular picture being calculated using a linear rate quantization scale model,
   means for calculating a quantization parameter (QP) for each current picture using said calculated target number of bits and a quantization scale determined by said rate quantization scale model,
   means for controlling said encoder using said quantization parameter (QP); and
   means for moving said sliding window by one picture each time said QP for a particular picture is calculated.

16. The system of rate control defined in claim 15 wherein said encoder, encodes pictures according to the H.264 compression standard.

17. The system of rate control recited in claim 15 wherein said series of pictures includes intraframe (I) pictures, forward prediction (P) pictures, and bidirectional prediction (B) pictures.

18. The system of rate control defined in claim 15 wherein an exponential based QP is converted to a linear scale QP in the calculation of said linear rate quantization scale model.

19. The system of rate control recited in claim 15 wherein said sliding window is moved by one picture each time that QP for a particular picture is calculated.

20. The rate control system recited in claim 15 wherein said sliding window takes in one new picture and drops one previous picture after said value of QP for the current picture is calculated and the new content of said window is used to calculate QP for the next picture.

21. The method of rate control defined in claim 1 wherein said sliding window covers a constant number of pictures, the method further comprising:
   after said value of QP for the current picture is calculated,
   taking into the sliding window a picture from a first GOP; and
   dropping from the sliding window a picture from a second GOP; and
   calculating QP for the next picture based on the new content of said sliding window including pictures from the first and second GOPs.

22. The system of rate control recited in claim 15 wherein said sliding window covers a constant number of pictures, the system further comprising:
   after said value of QP for the current picture is calculated,
   means for taking into the sliding window a picture from a first GOP; and
   means for dropping from the sliding window a picture from a second GOP;
   and
   means for calculating QP for the next picture based on the new content of said sliding window including pictures from the first and second GOPs.

23. The system of rate control recited in claim 15 wherein the means for moving said sliding window includes means for moving said sliding window across GOP boundaries so that the sliding window simultaneously covers pictures from multiple GOPs.

24. The system of rate control recited in claim 15, further comprising:
   means for initializing, by a rate control unit, the value of the bits ($B_r$) in the current sliding window by:

$$B_r = N_{win} * \frac{\text{Bit\_rate}}{\text{Picture\_rate}}$$

where $N_{win}$ is the number of pictures in the sliding window, Bit_rate is an integer value,
and Picture_rate is the rate at which pictures are encoded,
means for calculating, by the rate control unit, the target for the number of bits (Target_bits) as $$\text{Target\_bits} = \frac{\frac{X_{cur}}{K_{cur}}}{\left(\frac{N_i X_i}{K_i} + \frac{N_p X_p}{K_p} + \frac{N_b X_b}{K_b}\right)} * B_r$$

where, $N_i$ $N_p$ and $N_b$ are the remaining numbers of I, P, B picture in the current sliding window respectively, $X_i$, $X_p$ and $X_b$ are the complexity measurements of I, P, B pictures, $K_i$, $K_p$ and $K_b$ are constants to control the relative importance for I, P and B pictures, $X_{curr}$ is a measurement of complexity for a current picture, and $K_{curr}$ is a constant value for the current picture,
means for clipping the target number of bits per picture by:

$$\text{Target\_bits} = \max\left(\text{Target\_bits}, \frac{\text{Bit\_rate}}{16 * \text{Picture\_rate}}\right); \text{ and}$$

means for controlling said video encoder based on said clipped target number of bits per picture.

* * * * *